(12) United States Patent
Katzav et al.

(10) Patent No.: US 12,671,468 B2
(45) Date of Patent: Jun. 30, 2026

(54) WIRELESS POINT TO MULTIPOINT FRONTHAUL LINK

(71) Applicant: Parallel Wireless, Inc., Nashua, NH (US)

(72) Inventors: Ofir Ben Ari Katzav, Zur Itshak (IL); Netanel Gabizon, Salit (IL); Nadav Kaminsky, Ganei Tiqva (IL); Koby Shimonovich, Netivot (IL)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/587,950

(22) Filed: Feb. 27, 2024

(65) Prior Publication Data

US 2024/0348298 A1     Oct. 17, 2024

Related U.S. Application Data

(60) Provisional application No. 63/486,943, filed on Feb. 24, 2023.

(51) Int. Cl.
H04B 7/0456 (2017.01)
H04B 7/0426 (2017.01)

(52) U.S. Cl.
CPC .................................... H04B 7/043 (2013.01)

(58) Field of Classification Search
CPC .... H04B 7/043; H04B 7/0617; H04W 88/085
See application file for complete search history.

(56) References Cited

U.S. PATENT DOCUMENTS

| | | | |
|---|---|---|---|
| 8,879,416 | B2 | 11/2014 | Mishra et al. |
| 9,113,352 | B2 | 8/2015 | Agarwal et al. |
| 9,386,480 | B2 | 7/2016 | Papa et al. |
| 9,491,801 | B2 | 11/2016 | Donepudi et al. |
| 9,654,168 | B2 | 5/2017 | Papa et al. |
| 9,800,552 | B2 | 10/2017 | Garg et al. |
| 9,807,574 | B2 | 10/2017 | Navelekar et al. |
| 9,832,796 | B2 | 11/2017 | Mehta |
| 9,986,597 | B2 | 5/2018 | Mishra et al. |
| 10,129,158 | B2 | 11/2018 | Garg |
| 10,230,431 | B2 | 3/2019 | Cao et al. |
| 10,237,836 | B2 | 3/2019 | Navelekar et al. |
| 10,327,201 | B2 | 6/2019 | Garg et al. |
| 11,375,555 | B2 | 6/2022 | Garg et al. |
| 11,503,479 | B2 | 11/2022 | Kumar |
| 2015/0270882 | A1* | 9/2015 | Shattil .................... H04B 7/024 370/329 |
| 2017/0346525 | A1* | 11/2017 | Stirling-Gallacher ...................... H04B 7/022 |
| 2020/0295805 | A1 | 9/2020 | Cao et al. |
| 2021/0266123 | A1 | 8/2021 | Pianka et al. |

* cited by examiner

*Primary Examiner* — Vineeta S Panwalkar
(74) *Attorney, Agent, or Firm* — Michael Y. Saji

(57) ABSTRACT

High capacity, long range wireless communication link was ever needed. With the technology advancement and the requirement for higher data rates and limited latency requirements the existing solutions are providing partial and very limited solution. We propose new approach that provides the need in an efficient way and with the required properties to allow easy use and tuning as well as great robustness with link redundancy.

14 Claims, 9 Drawing Sheets

100

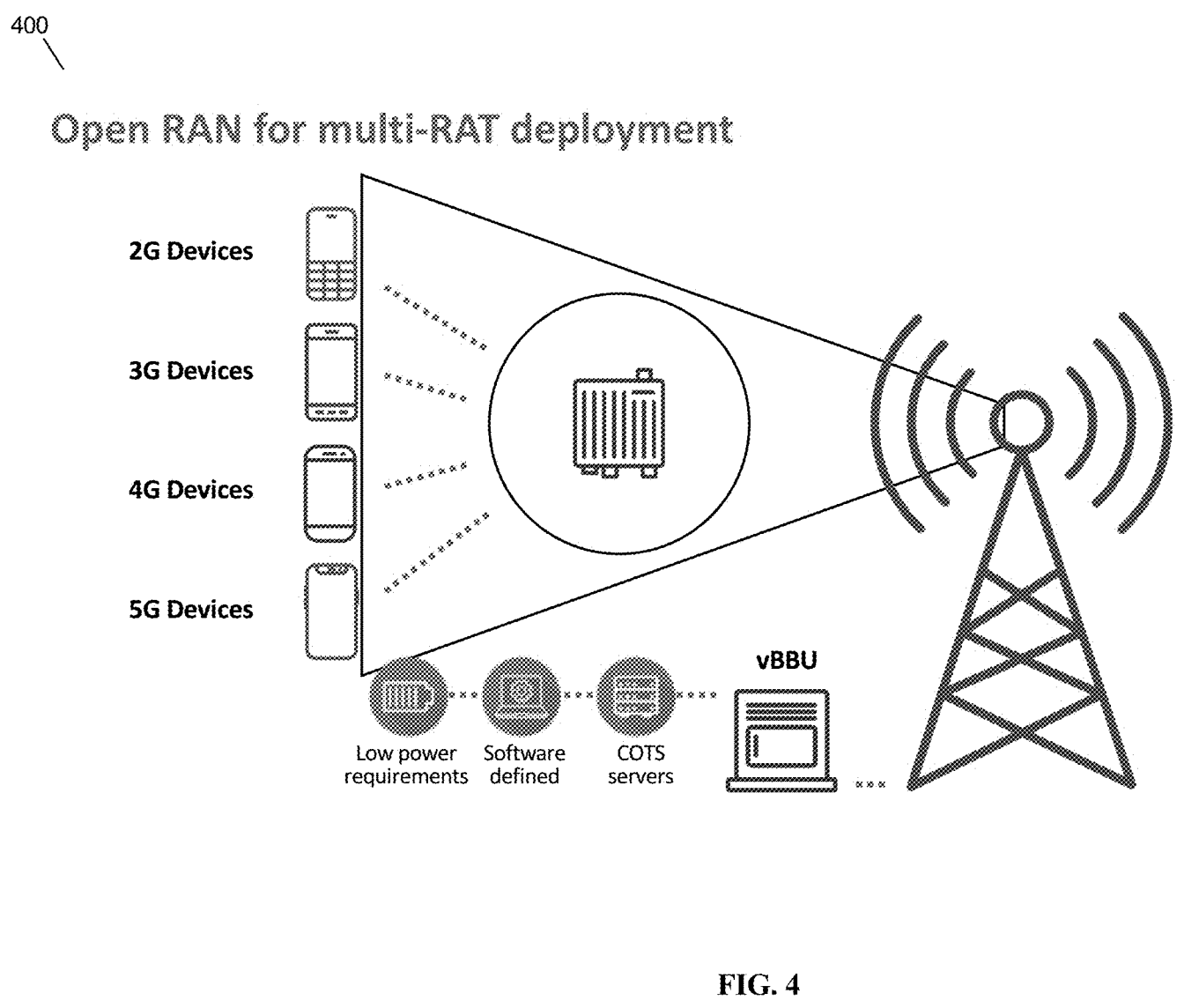

Open RAN for multi-RAT deployment

400

2G Devices

3G Devices

4G Devices

5G Devices vBBU

COTS servers

Software defined

Low power requirements

FIG. 4

WIRELESS POINT TO MULTIPOINT FRONTHAUL LINK

CROSS-REFERENCE TO RELATED APPLICATIONS

The present application claims the benefit of priority under 35 U.S.C. § 119(e) to U.S. Provisional Patent App. No. 63/486,943, filed Feb. 24, 2023, and having the title "Approach for high capacity, long range, wireless link with point to multipoint capabilities and embedded link security," which is also hereby incorporated by reference in its entirety for all purposes. In addition, the present application incorporates by reference, in its entirety for all purposes, U.S. patent application Ser. No. 18/582,475, having title "RAN Centralization Solution" and filed Feb. 20, 2024. Additionally, the following U.S. patents, patent applications, or patent application publications are incorporated by reference in their entirety for all purposes: U.S. Pat. Nos. 8,867, 418B2; 8,879,416B2; 9,113,352B2; 9,232,547B2; US20140133456A1; US20150094114A1; US20150098385A1; US20150098387A1; US20150257051A1; US20160044531A1; US20160135132A1; US20170013513A1; US20170019375A1; US20170026845A1; US20170048710A1; US20170055186A1; US20170064621A1; US20170070436A1; US20170077979A1; US20170111482A1; US20170127409A1; US20170171828A1; US20170181119A1; US20170202006A1; US20170208560A1; US20170238278A1; US20170257133A1; US20170272330A1; US20170273134A1; US20170288813A1; US20170295510A1; US20170303163A1; US20170347307A1; US20180123950A1; US20180152865A1; US20210045193A1; US20210176823A1; US20210243156A1; US20210306899A1; US20210289433A1; US20230269633A1; U.S. Ser. No. 18/346,192; U.S. Ser. No. 18/522,024; U.S. Ser. No. 18/346,191; U.S. Ser. No. 18/346,189; U.S. Ser. No. 18/346,188; U.S. Ser. No. 18/346, 187; U.S. Ser. No. 18/346,181; U.S. Ser. No. 18/346,186.

BACKGROUND

A high-capacity link, defined herein as a greater than 10 Gbps link, is increasingly becoming a requirement for many use cases. Among its advantages is its ability to provide high capacity, low latency and stringent requirements for jitter for the link between data center and cellular cell site. Another family of use cases is security and military ones that requires high capacity, low latency and link robustness. There are likely many more applications that can benefit. It is common at the time of writing to implement such links with fiber optic media, but this is expensive. The only other commonly known alternative is to move more and more compute load to cell-site and reduce dramatically the link capacity and latency requirements (which is also a very common deployment approach today).

As well, there are systems today which are attempting to provide point to point wireless connectivity. Except for gaps in capacity and latency, these systems expose additional gaps like: (1) all of those systems are point to point with relatively hard tuning approach (very directional antennas that require mechanical tuning), (2) link security is commonly not being considered and another external layer of security (e.g. IPSEC or the like) is being used, (3) the link is always single point of failure, hence doesn't provide sufficient redundancy or resiliency for sensitive use cases, (4) currently available solutions are capacity limited and hence use case limited, (5) existing solutions are unable to provide flexibility for routing changes which makes them more sensitive to failures, (6), to get to the more advanced use cases, one need to utilize the entire available spectrum (e.g. microwave solutions that use a dual band approach), this requires spectrum licensing which may be expensive, (7) link reliability is highly prone to external weather conditions and data rate is not guaranteed, (8) when stressing existing solutions to the higher capacity level, the required hardware becomes physically larger (e.g. very directional antenna) which takes more significant footprint when mounted and making the solution impractical for some use cases (e.g. RAN dense urban cell-site/military use cases)

BRIEF DESCRIPTION OF THE DRAWINGS

FIG. 4 is a first schematic diagram of a multi-RAT RAN deployment architecture, in accordance with some embodiments.

DETAILED DESCRIPTION

Figure 1:
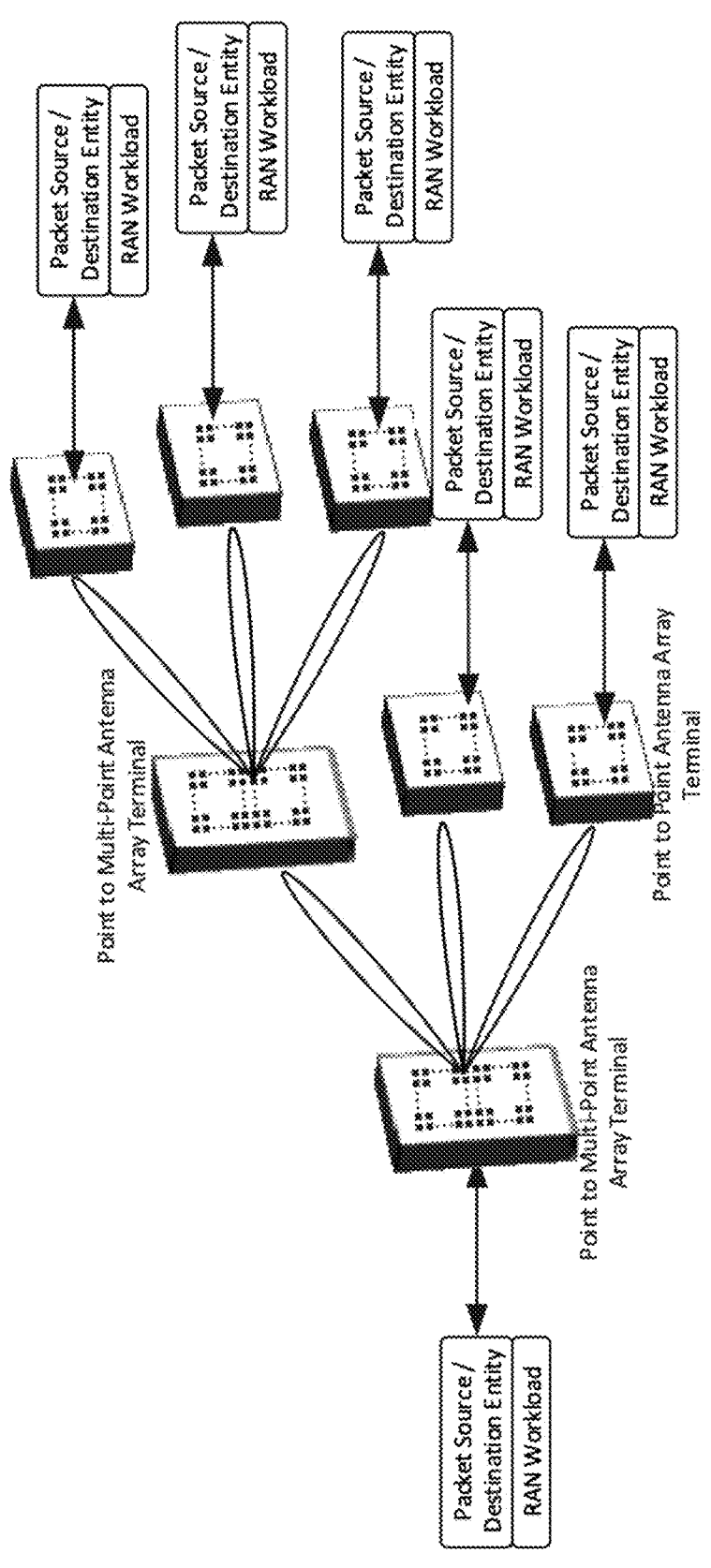
FIG. 1 is a schematic diagram of a fronthaul link, in accordance with some embodiments.

We propose novel approach to redesign the wireless link in more advanced, yet common and flexible approach, with greater abilities that can fit well to the new age requirements.

In particular, a mmWave based solution is considered, and the use of a large antenna array together with fast beam-forming processing provides significant beamforming gains.

Using an antenna array as described herein, a particular mmWave channel may be selected in frequencies that are less attenuated based on signal propagation physics. The described antenna array has physical characteristics that enable its use across the mm Wave frequency range without physical reconfiguration, allowing selection of a particular mmWave channel can be made based on 5G spectrum granted for the operating entity (network operator).

The present approach will be a game changer in multiple use cases. One of them is the cellular site connectivity to the data center that allows full RAN centralization without the constraints of fiber optic distribution (and cost). This also enables wireless high capacity and robust communication. Although microwave backhaul/midhaul solutions currently exist in the market that are suitable for certain low-end use cases, those solutions can provide only partial solution for the problems being tackled here.

A mmWave based solution with large antenna array that leverage advanced beamforming algorithms is used, in some embodiments. The solution can provide few dozens of Gbps for a range for many kilometers (greater than 10 km is excellent for all known use cases). The array size design is suitable for point to multi-point wireless communication, which then enables high capacity, low latency and flexible mass connectivity. In particular, the use of a large array size with individual emitting elements enables the use of beam steering and beamforming, which enables enhanced multi-point wireless communication with dynamic, software-based configuration. Beamforming also enables higher signal-to-noise ratio even when used solely in a point-to-point configuration.

Point to Multi-Point

We propose a scalable solution that can fit lower capacity and range requirements as well as extremely high capacity and greater range requirements. The same property allows us to increase the number of links with single box. The fact that multiple and independent links are possible, our solution is able to hold connectivity between one end point to multiple end points. With point to multi-point capabilities, combined with high capacity link, we propose to create mesh connectivity of the network. Mesh connectivity allows some good benefits to the system that is unparalleled to existing systems: i. Link redundancy is a byproduct of the solution and can be leveraged to accommodate temporary link failures by re-routing the required signals through other available paths; ii. Link resiliency is much greater; with respect to signal blocking or interference, the mesh approach based on the proposed solution is much harder and thus less prone to external blocking and/or interference. This is also due to the fact that specific link failure (e.g. by blocking) will not cause the entire network to fail and with proper network design, will be mitigated via other available routes in the network.

Continuing with the discussion of mesh connectivity, we propose also automatic routing of the network based on best available link, in some embodiments. Best available link determined by link availability and/or available capacity and/or best latency or fixed latency (per need) and such. The proposed solution may hold the ability to measure or quantify the latency between each 2 points-providing the per link latency as side information to the system. The link latency can then be used for multiple use cases such us proper compensation in the higher layers of the network.

Signal relaying and/or multi hopping is contemplated, in some embodiments. In case the deployment is limited in path loss (can be due to terrain, or other line of site limitation between the devices), or in case we want to increase the cell range, the solution may support signal multi hopping for range extension, including in a mesh scenario.

The inventors note that this invention is not limited to mm Wave frequency range and can be adopted in other frequencies that satisfies the capacity and range requirements. The invention may be implemented also on light based links, such as lasers.

In some embodiments, the underlying PHY for the point-to-multipoint link may use 5G signaling or 5G signaling approaches, so as simplify the solution as well as reduce development cost. Using 5G signaling approaches in non-utilized frequencies enables the high data rate and low latency characterized herein.

In some embodiments, sync can be either avoided (free running) when regulations permit, or can be achieved with either GNSS/GPS based solutions, any PTP approach (e.g. 1588) or dedicated sync signal, in particular when the P2MPAAT used as a RAN.

High capacity is achieved by multi-beam (MU-MIMO or the like) approach where each beam can carry significant data rates, in some embodiments, with data rates from 10 Gbps to 30 Gbps currently enabled. Long distance is achieved with significant array gain for the beamforming which can get to more than 10 km (which is the challenging limitation of existing systems today).

For beam steering, an advanced approach is used, using physically fixed RF transmitting components that enable the proposed system is fully passive one from mechanical point of view, in some embodiments. The signal directivity is achieved by either analog or digital beamforming. Non-mechanical beam tuning allows more flexible installation and then tracking of the best link between any two points—this can be done dynamically as needed. This property allows the proposed solution to work between two or more nonstationary end points, including enabling one or more of the end points to be moving (e.g. use case of ground to drone communication). Advanced beam steering that includes directive nulling of signals is used in some embodiments; this technology provides the benefit of canceling incoming interference signals from the receiver or nulling the transmitted signal toward direction of other system and avoid interference.

In some embodiments, an ORAN based interface can be used for input/output of the antenna array. This allows Ethernet-like (eCPRI) communication which is flexible, low overhead, and less demanding compared to other approaches. Any other interface for providing data to be sent/received can be configured to work properly as well, with varying impacts on latency and overhead.

In some embodiments, when used in a hierarchical network topology for fronthaul, PHY processing (e.g., RAN workload) for one or more RANs as well as the PHY processing for downstream antenna arrays can be sent upstream using the high capacity wireless fronthaul link described herein, as long as it is able to be sent and processed within the available latency budget allowed by the particular standard being used.

Security

In most use cases, link security is required to avoid man in the middle attacks. We propose embedded security solution on each side of the link. HW accelerated security algorithm can be implemented as part of the link. Alternatively, 5G security approach for user data can be leveraged for link security.

Use Cases

The primary use case contemplated herein is in high capacity, low latency and jitter and long range wireless link to satisfy data center to cell-site communication, in some embodiments. The proposed solution can be used to any kind of data center to RAN cell-site communication. This disclosure can also be leveraged for wireless fronthaul communication as alternative for wired and/or optical infrastructure, as such alternatives are not always possible or even feasible.

The present disclosure may be used not only for fronthaul communication but in any level of communication between the data center and cell site such as mid-haul or backhaul, in some embodiments. Security and military use cases are also applicable, mainly, for example for ground forces and their high capacity, long range demands.

FIG. 1 shows a plurality 100 of point-to-multipoint antenna array terminals (P2MPAAT), in conjunction with multiple packet endpoints, in accordance with some embodiments. As shown, each antenna array terminal is a radio transceiver. The antenna array terminals are different sizes; the configurations may be modular, in some embodiments, whether 2×2, 4×4, 8×8, 16×16, 16×64, 32×32, 64×64, or other configurations. The P2MPAATs with larger sizes are able to direct different physical beams toward other array terminals, using beamforming, in some embodiments. Each P2MPAAT is physically coupled to a packet source/destination entity, which could be a base station or RAN, in some embodiments, or in other embodiments could be another entity such as a backhaul connection, a core network gateway, an enterprise telephony system, etc. The use of a P2MPAAT enables separation of a radio CU and DU, in some embodiments, because the latency of the connection is low enough for many use cases to enable fronthaul for a radio transceiver to be placed on the opposite side of a P2MPAAT connection. In some embodiments, all or part of a particular P2MPAAT may also be configured for use as a radio transceiver in a RAN, providing RAT services to UEs, in some embodiments, in conjunction with, or in place of, its functionality of providing fronthaul. A P2MPAAT may thus be used to provide an access network for a base station, as well as to provide fronthaul for that base station to a PHY layer for processing signals sent and received by the base station. As shown, a hierarchical topology of P2MP is contemplated, as well as other network topologies as needed, which can be useful to enable workload sharing of complex and dynamic fronthaul workloads.

Figure 2:
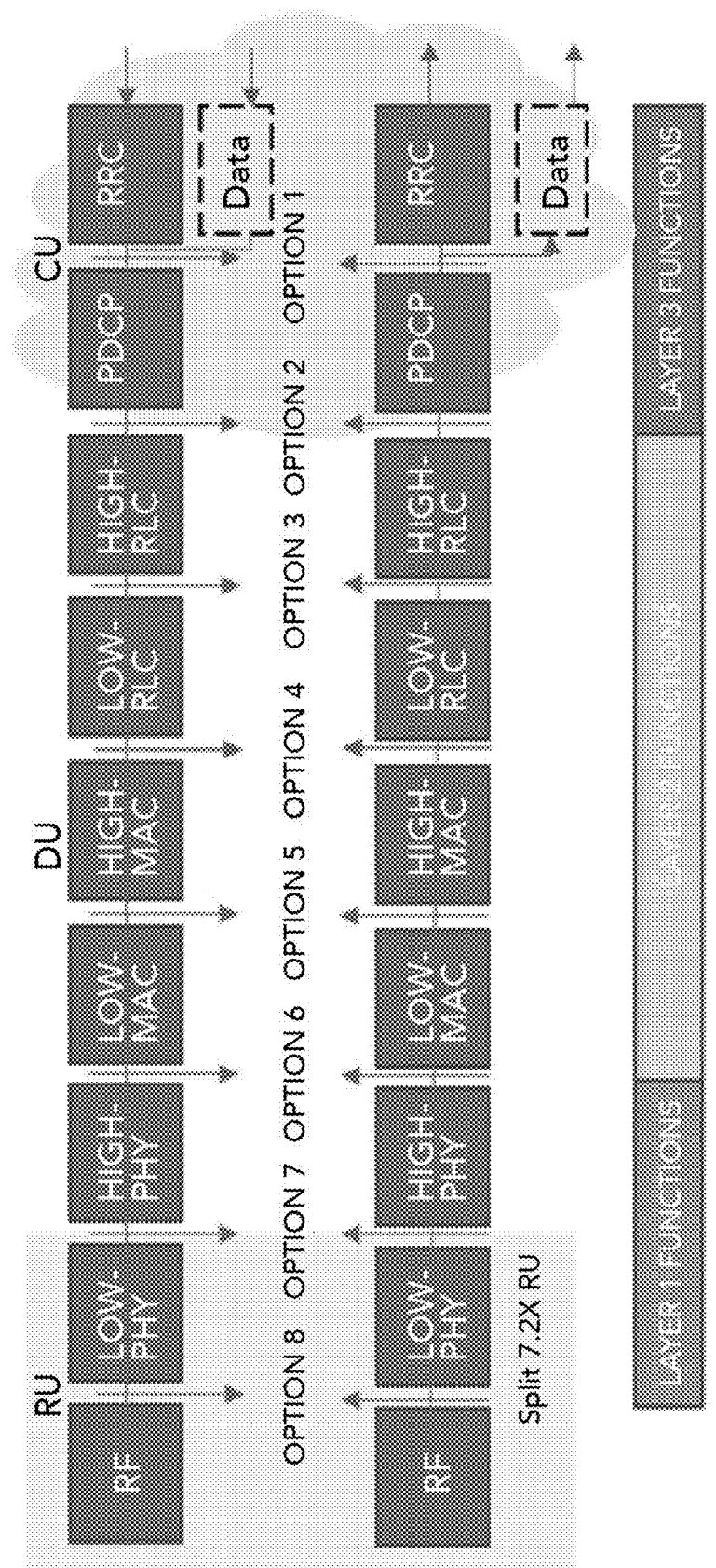
FIG. 2 is a schematic diagram of 3GPP functional splits, as known in the prior art.

FIG. 2 shows a schematic diagram of radio functional splits showing split 7.2× RU as well as other splits. The use of these functional splits is encouraged by ORAN.

5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 4) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Figure 3:
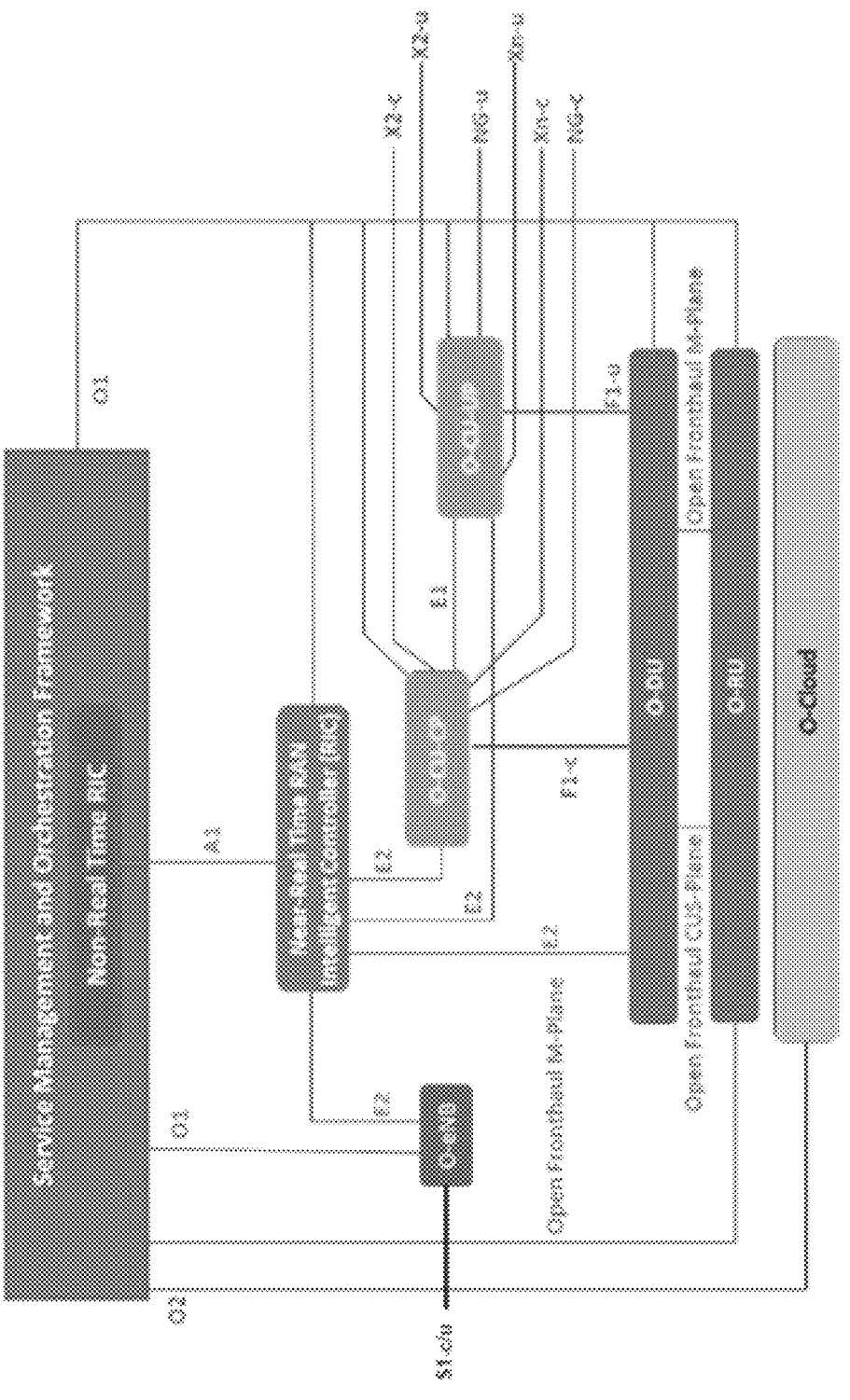
FIG. 3 is a schematic diagram of an Open RAN 4G/5G deployment architecture, as known in the prior art.

FIG. 3 is a schematic diagram of an Open RAN 4G/5G deployment architecture, as known in the prior art. The O-RAN deployment architecture includes an O-DU and O-RU, as described above with respect to FIG. 2, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU.

FIG. 4 is a first schematic diagram of a multi-RAT RAN deployment architecture, in accordance with some embodiments. FIG. 4 shows a radio tower with a remote radio head (RRH) supporting multiple RATs, 2G/3G/4G/5G, but without requiring four generations of radio base stations as shown in FIG. 1. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 1 have been replaced with one or more vBBUs, baseband units that are rearchitected to use modern virtualization technologies. FIG. 4 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

Figure 5:
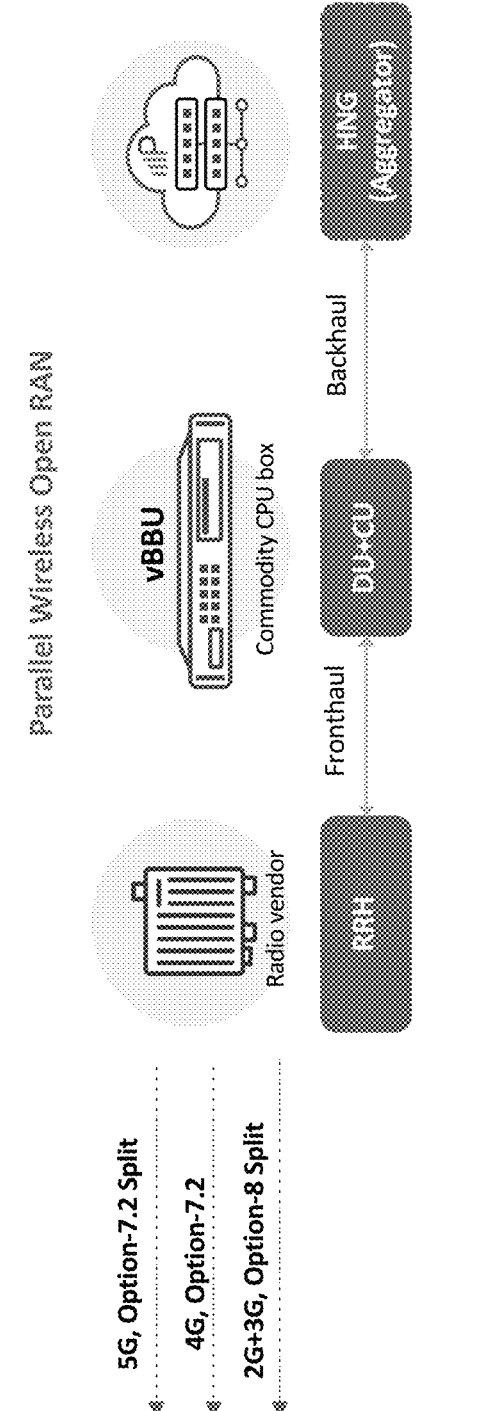
FIG. 5 is a second schematic diagram of a multi-RAT RAN deployment architecture, in accordance with some embodiments.

FIG. 5 is a second schematic diagram of a multi-RAT RAN deployment architecture, in accordance with some embodiments. As shown, a single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (iFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 5, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

Figure 6:
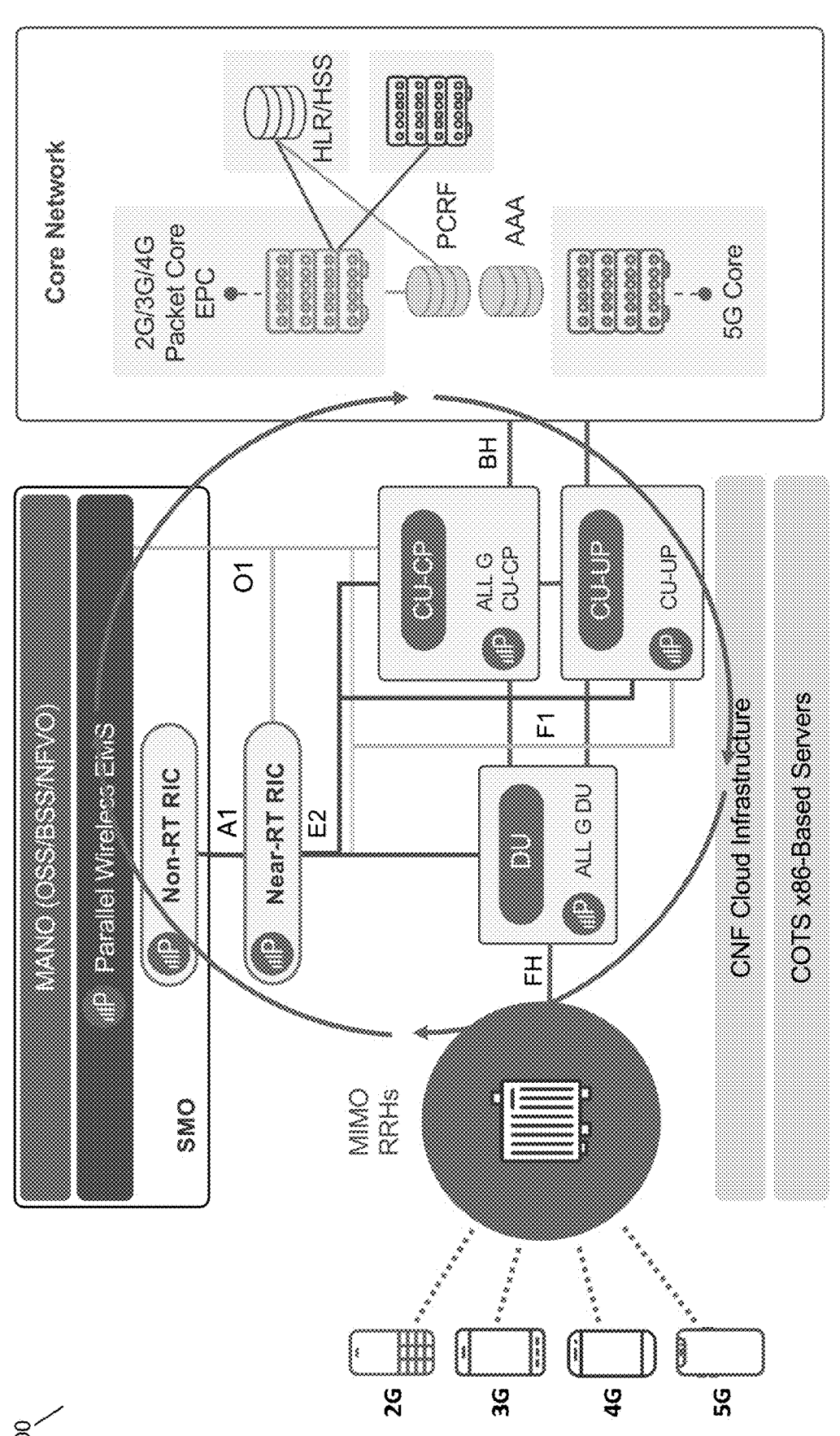
FIG. 6 is a third schematic diagram of a multi-RAT RAN deployment architecture, in accordance with some embodiments.

FIG. 6 is a third schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Figure 7:
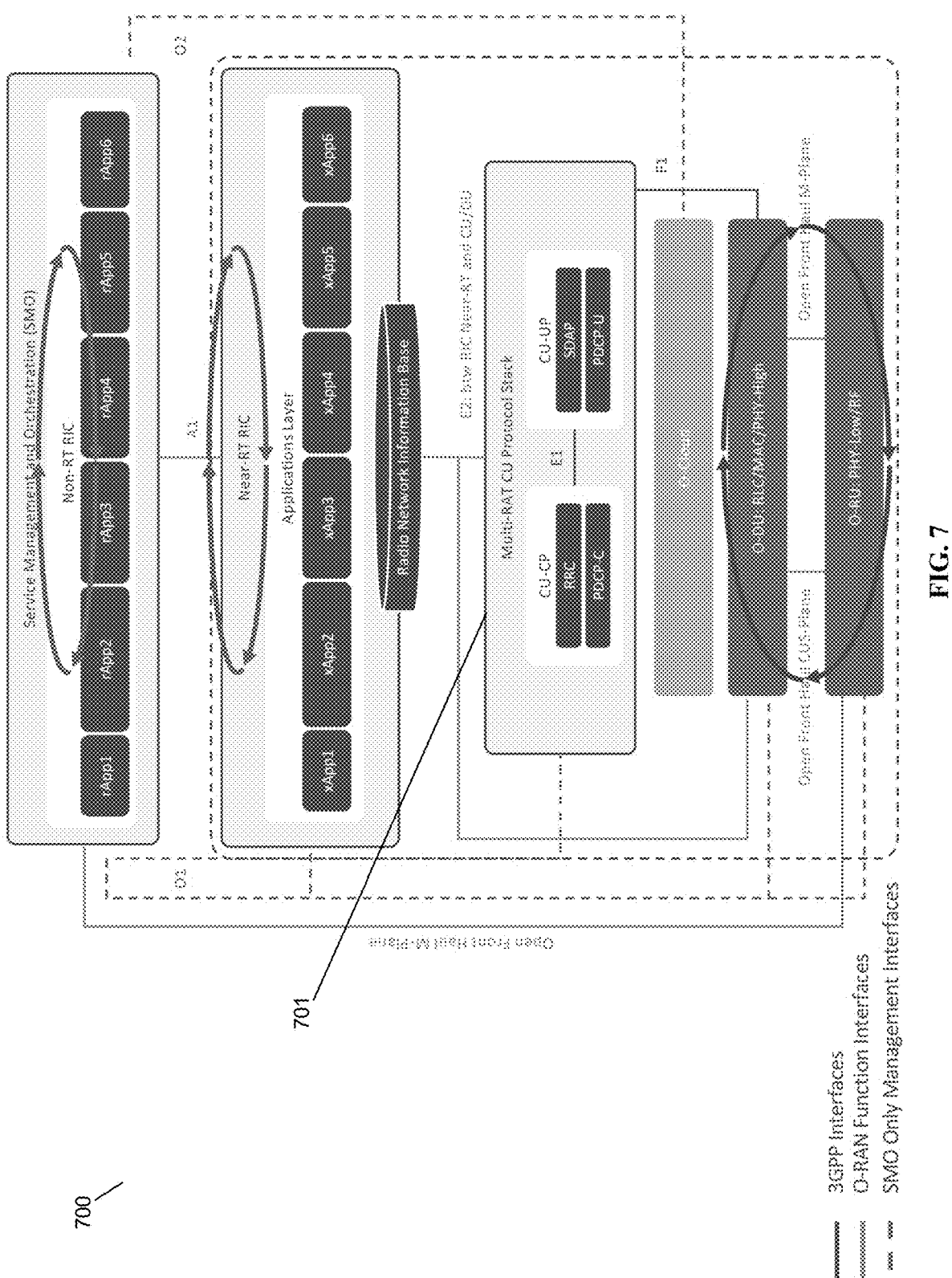
FIG. 7 is a fourth schematic diagram of a multi-RAT RAN deployment architecture, in accordance with some embodiments.

FIG. 7 is a fourth schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

Figure 8:
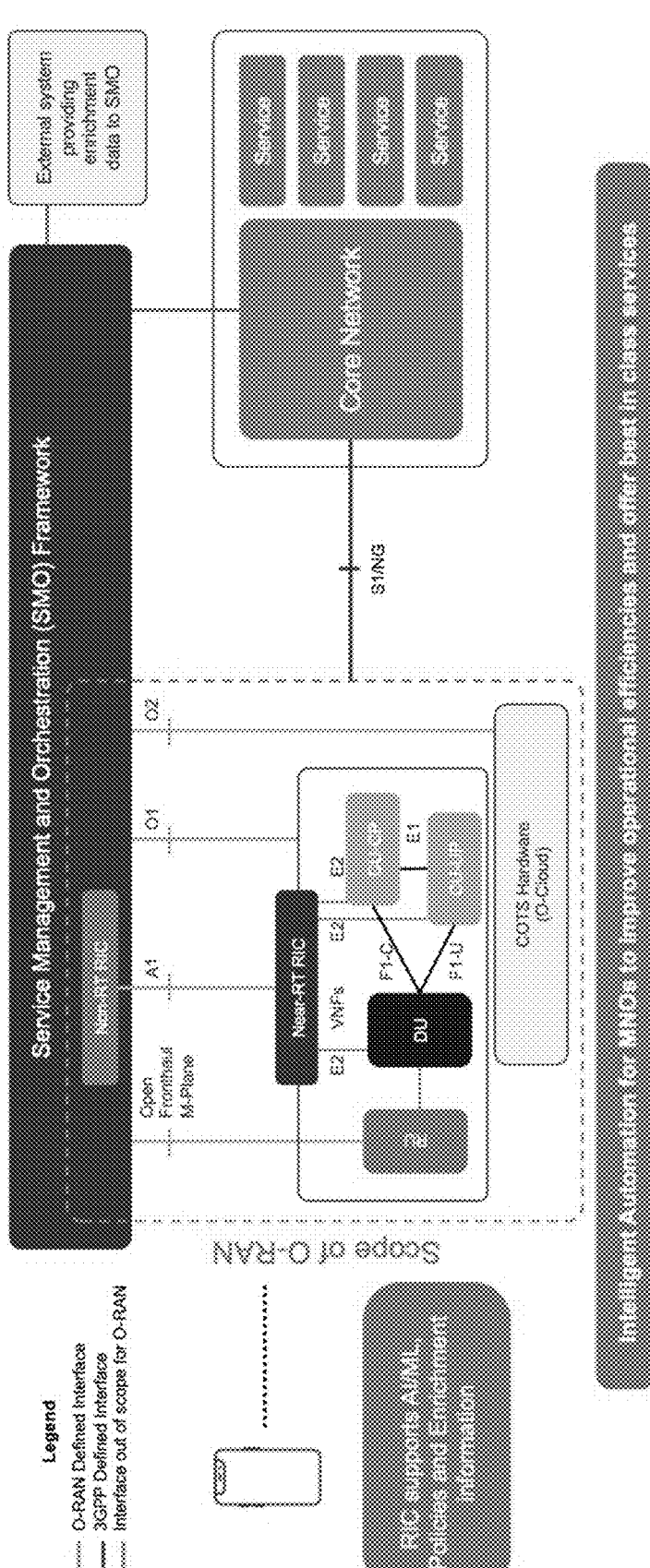
FIG. 8 is a fifth schematic diagram of a multi-RAT RAN deployment architecture, in accordance with some embodiments.

FIG. 8 is a fifth schematic diagram of a multi-RAT RAN deployment architecture, in accordance with some embodiments. This schematic diagram shows the use of the near/non-RT RIC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

Figure 9:
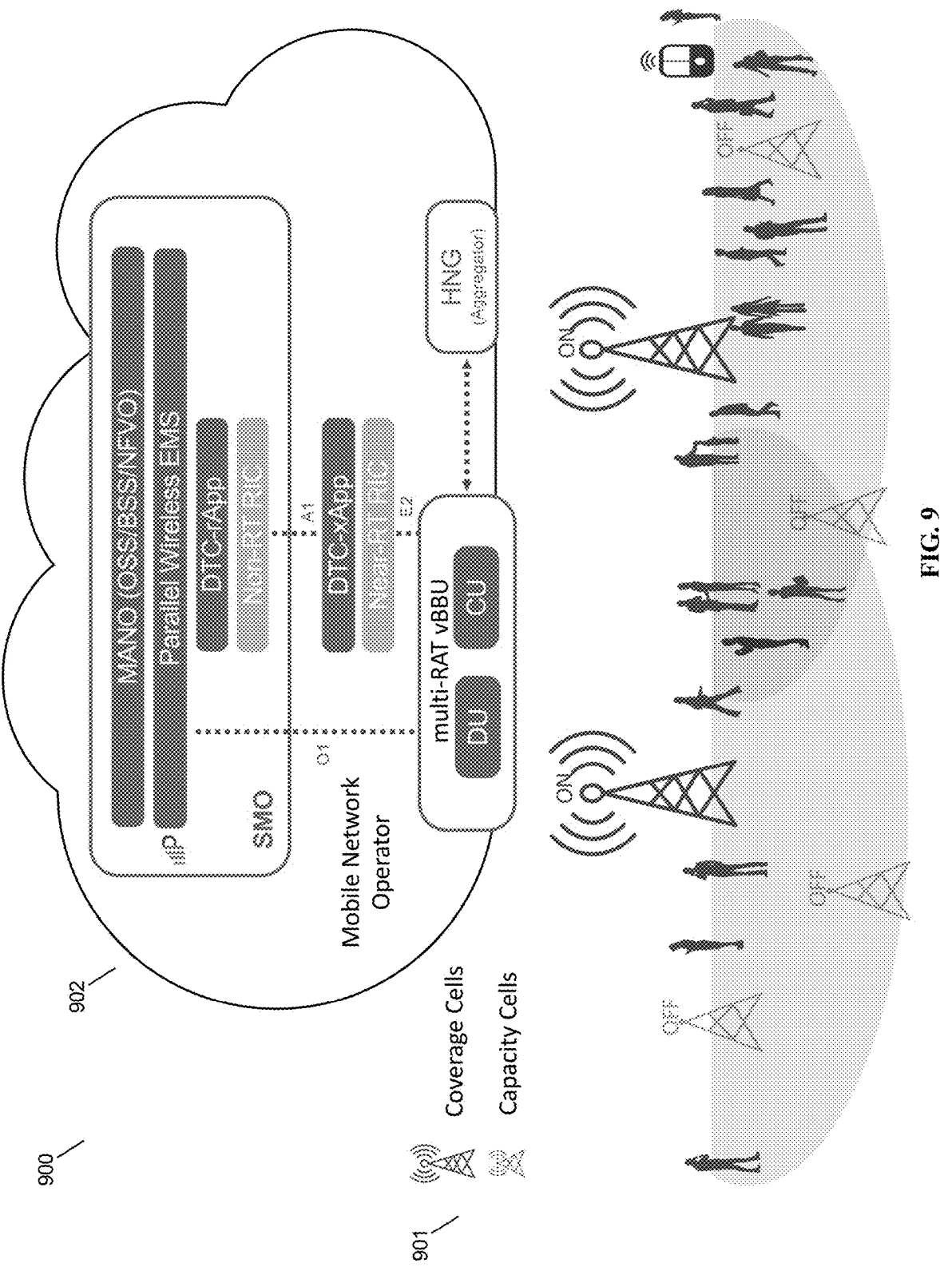
FIG. 9 is a schematic diagram of a multi-RAT RAN deployment in operation, in accordance with some embodiments.

FIG. 9 is a schematic diagram of a multi-RAT RAN deployment in operation, in accordance with some embodiments. Diagram 901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 902 is a schematic diagram of the operator network, in accordance with some embodiments. A multi-RAT vBBU is in communication with a near-RT RIC and a non-RT RIC, as well as a Parallel Wireless element management system (EMS), which provides the system with awareness about active network nodes, as well as a MANO (OSS/BSS/NFVO) for network operational capabilities. The coverage and capacity cells shown in 901 are in communication with the all-G near-RT RIC and all-G non-RT RIC. Network functions are managed by applications, called xApps when running on the near-RT RIC and rApps when running on the non-RT RIC, and these applications are in communication with each other and aware of the network conditions through information available at the systems on which they are running.

In operation, for some embodiments, for example, when a coverage cell is heavily loaded, an rApp on the non-RT RIC and an xApp on the near-RT RIC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT RIC using an xApp, in some embodiments. This may be a multi-RAT activity and this may involve monitoring of network load for a first RAT and an instruction to perform throttling for a second RAT, in some embodiments.

Additional Embodiments

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 3GPP, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A wireless fronthaul network, comprising:

a millimeter-wave radio transceiver further comprising multiple antennas in an array, the multiple antennas configured to operate in concert to provide beamforming;

wherein the millimeter-wave radio transceiver is configured to provide a point-to-multipoint connection to a plurality of millimeter-wave radio transceivers, wherein the millimeter-wave radio transceiver is configured to use a 5G signaling approach, and wherein the millimeter-wave radio transceiver is configurable in software to perform beamforming alignment with the plurality of connected millimeter-wave radio transceivers, and wherein the millimeter-wave radio transceiver is arranged in a hierarchical topology with other transceivers to enable workload sharing of fronthaul workloads.

2. The wireless fronthaul network of claim 1, wherein fronthaul processing for a cellular base station is provided using the wireless fronthaul network.

3. The wireless fronthaul network of claim 1, wherein the millimeter-wave radio transceiver is configured to provide mesh connectivity.

4. The wireless fronthaul network of claim 1, wherein the millimeter-wave radio transceiver is configured to perform automatic routing based on a best available link, wherein the best available link is determined by at least one of: link availability, available capacity, or latency.

5. The wireless fronthaul network of claim 1, wherein the millimeter-wave radio transceiver is configured to support signal multi-hopping for range extension.

6. The wireless fronthaul network of claim 1, wherein the millimeter-wave radio transceiver is configured to provide link redundancy by re-routing signals through other available paths in response to temporary link failures.

7. The wireless fronthaul network of claim 1, wherein the millimeter-wave radio transceiver uses physically fixed radio frequency (RF) transmitting components and achieves signal directivity through analog or digital beamforming, enabling non-mechanical beam tuning for dynamic tracking of a best link between any two points.

8. The wireless fronthaul network of claim 1, wherein the millimeter-wave radio transceiver is configured to measure latency between each pair of connected points and provide per-link latency as side information for use in compensation at higher layers of the network.

9. The wireless fronthaul network of claim 1, wherein the millimeter-wave radio transceiver is configured to communicate with at least one non-stationary endpoint, including a moving endpoint.

10. The wireless fronthaul network of claim 1, wherein the millimeter-wave radio transceiver comprises a modular antenna array configuration selected from the group consisting of: 2×2, 4×4, 8×8, 16×16, 16×64, 32×32, and 64×64 configurations, wherein larger configurations are able to be split such that different physical beams are directed toward other array terminals using beamforming.

11. The wireless fronthaul network of claim 1, wherein the millimeter-wave radio transceiver uses an ORAN-based interface for input/output, enabling eCPRI communication.

12. The wireless fronthaul network of claim 1, wherein the millimeter-wave radio transceiver is configured to perform directive nulling of signals to cancel incoming interference signals at a receiver or to null a transmitted signal toward a direction of another system to avoid interference.

13. The wireless fronthaul network of claim 1, wherein the millimeter-wave radio transceiver is configured to send radio frequency (RF) physical layer (PHY) data, for one or more radio access networks (RANs) that are colocated with or downstream from a given wireless fronthaul network node, upstream for processing by another network node.

14. The wireless fronthaul network of claim 1, wherein the millimeter-wave radio transceiver is configured to calculate a latency budget for certain radio frequency (RF) physical layer (PHY) data, and configured to send the certain RF PHY data upstream for processing by another network node such that the latency budget is met.

* * * * *